United States Patent [19]

Crosby

[11] 4,391,703
[45] Jul. 5, 1983

[54] MARINE SEWAGE TREATMENT WITH BIOLOGICAL FILTER

[75] Inventor: Gary A. Crosby, New Iberia, La.

[73] Assignee: Red Fox Industries, Inc., New Iberia, La.

[21] Appl. No.: 365,889

[22] Filed: Apr. 6, 1982

Related U.S. Application Data

[63] Continuation of Ser. No. 175,400, Aug. 5, 1980, abandoned.

[51] Int. Cl.³ .............................................. C02F 3/10
[52] U.S. Cl. .................................... 210/151; 210/202; 210/218; 210/220; 210/256
[58] Field of Search ............... 210/617, 618, 150, 151, 210/170, 195.4, 197, 202, 218, 220, 256, 261; 261/DIG. 72

[56] References Cited

U.S. PATENT DOCUMENTS

| | | | |
|---|---|---|---|
| 2,901,114 | 8/1959 | Smith et al. | 210/256 X |
| 3,122,594 | 2/1964 | Kielback | 261/DIG. 72 |
| 3,409,279 | 11/1968 | Metrailer | 261/DIG. 72 |
| 3,412,864 | 11/1968 | Okada | 210/151 |
| 3,543,937 | 12/1970 | Choun | 210/150 |
| 3,648,439 | 3/1972 | Szczepanski | 261/DIG. 72 |
| 3,713,543 | 1/1973 | Heaney | 210/256 X |
| 3,825,119 | 7/1974 | Rost | 210/150 X |
| 3,956,127 | 5/1976 | Holmberg | 210/150 |
| 3,956,128 | 5/1976 | Turner | 210/150 |
| 3,966,608 | 6/1976 | Mason et al. | 210/151 |
| 3,980,561 | 9/1976 | Miyagi et al. | 210/151 |
| 4,028,244 | 6/1977 | Holmberg | 210/150 |
| 4,069,156 | 1/1978 | Mason | 210/256 X |
| 4,159,945 | 7/1979 | Savage | 210/618 |
| 4,253,957 | 3/1981 | Sullivan | 210/218 X |

Primary Examiner—Robert H. Spitzer
Attorney, Agent, or Firm—Guy E. Matthews

[57] ABSTRACT

The present disclosure is directed to a sewage disposal system having a central aeration chamber flanked on each side by a pair of biological filters each containing tiers of buoyant plastic hollow spheres through and over which the liquid from the aeration chamber flows upwardly and the filters are connected at the top by a crossover pipe positioned below the top level of sludge in the aeration chamber. The crossover pipe communicates with a vertical riser which functions with a vertical antisyphon vent. The riser communicates with a flexible hose which connects the primary central aeration chamber with the chlorine contact tank to receive the sludge from the biological filters for chlorinating the liquid and providing an adequate retention time for disinfection prior to discharge overboard.

5 Claims, 3 Drawing Figures

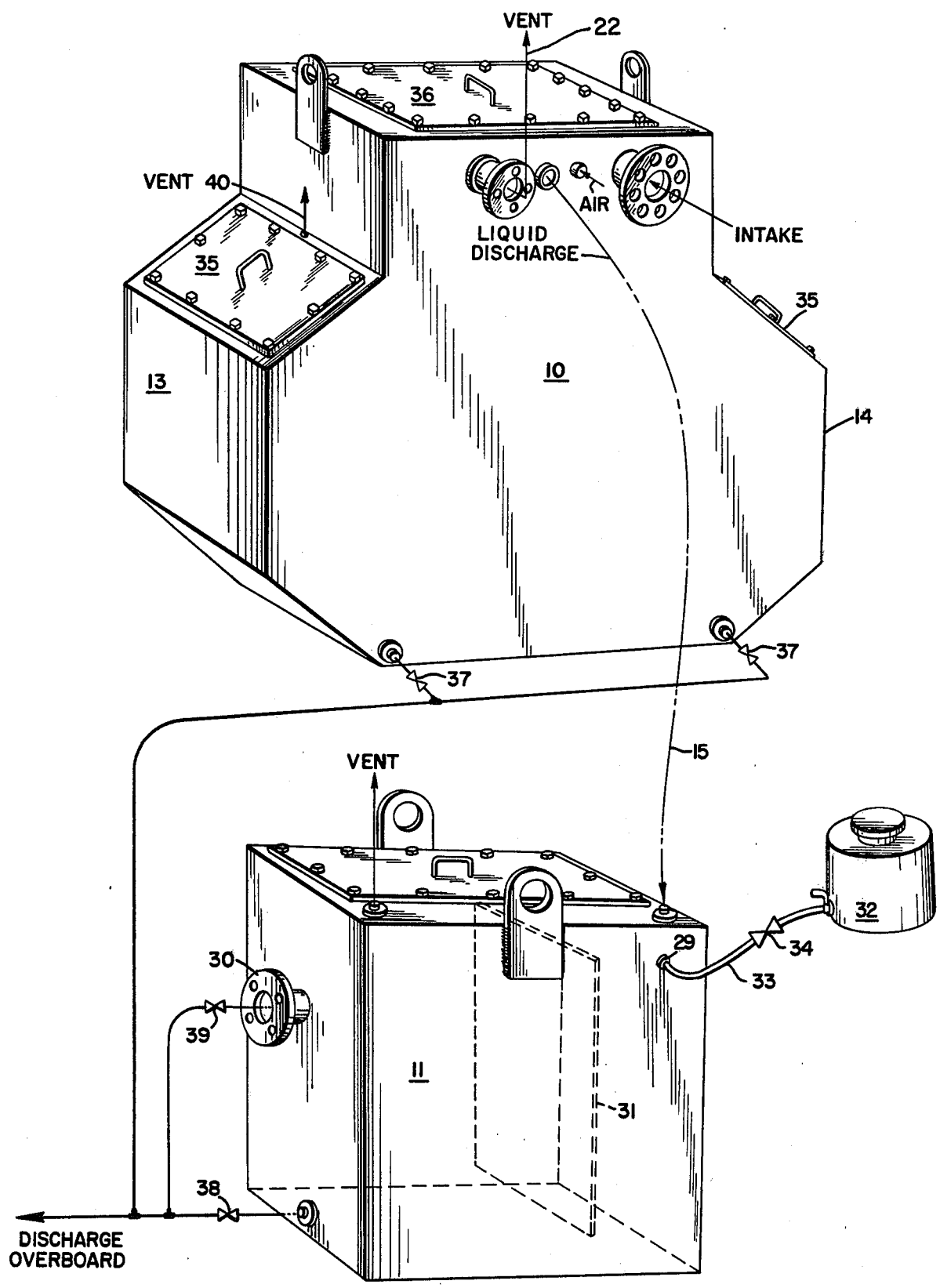

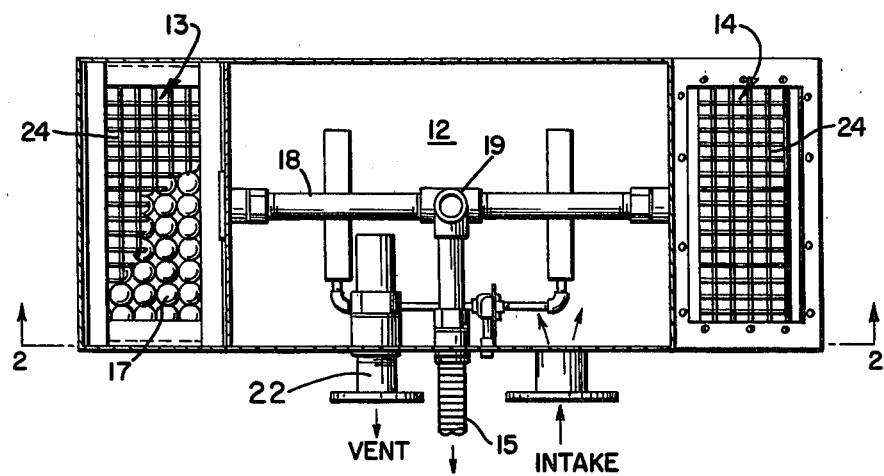
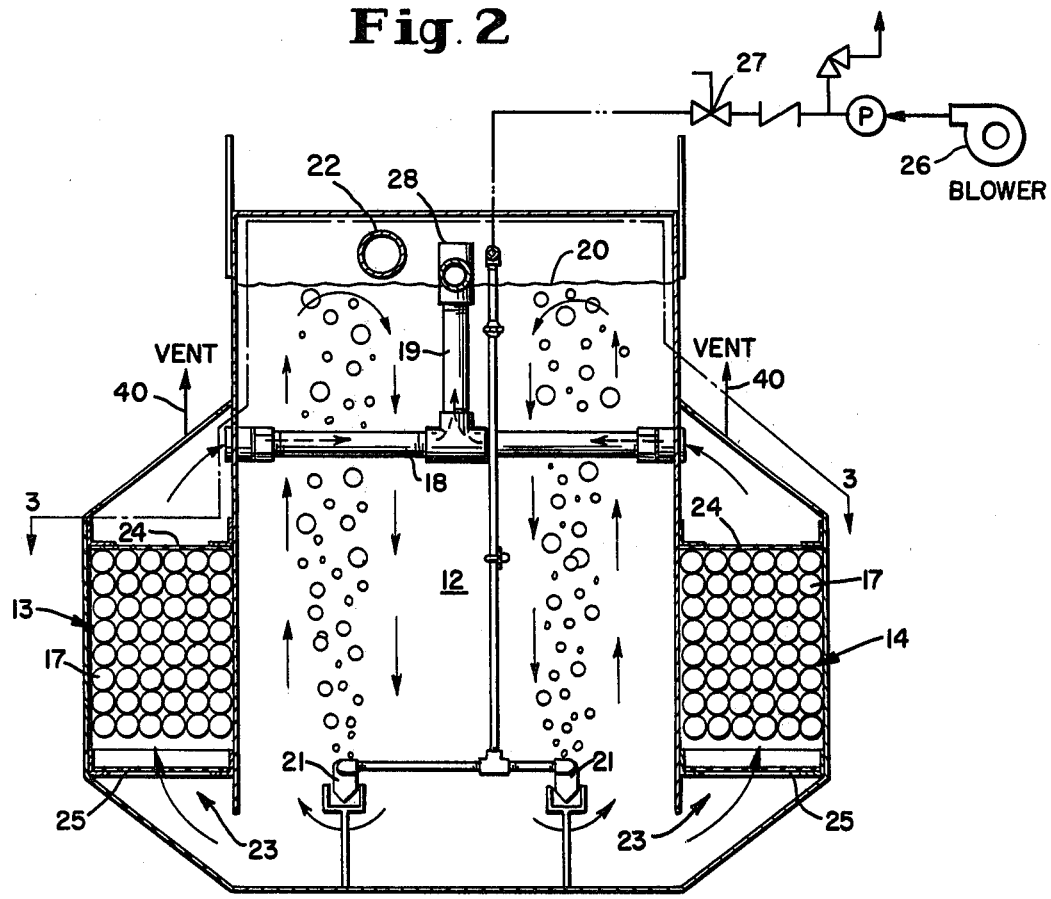

MARINE SEWAGE TREATMENT WITH BIOLOGICAL FILTER

This is a continuation, of application Ser. No. 175,400, filed Aug. 5, 1980, abandoned.

BACKGROUND OF THE INVENTION

The present disclosure is directed to an activated sludge sewage disposal system of the type adapted for marine use.

The sewage apparatus consists of a central aeration chamber with aeration orifices located at the bottom. Typically a pair of biological filters along each side are positioned such that aerated sludge is circulated up and into the biological filters. A crossover pipe, connecting the two biological filters, is positioned below the top level of the sludge in the aeration chamber. An exit pipe and anti-syphon vent pipe are connected to the crossover pipe. Th exit pipe goes to the chlorine contact tank through a flexible hose. The chlorine contact tank is a two-section apparatus, the sections being separated by a vertical baffle. The principal novelty, however, appears to reside in the design of the biological filters.

Basically, the filter has a filter medium of a plurality of hollow plastic balls that float on the aerated sludge. This provides contact area for aerobic treatment of the sludge. The buoyant balls are contained by an upper fiberglas grating and a lower fiberglas retention grating. The biological filter allows for both physical and biological filtering.

The following prior patents are pertinent:

| 3122594 | Kielback | 3825119 | Rost |
| 3409279 | Metrailer | 3956128 | Turner |
| 3543937 | Choun | 3966608 | Mason et al |
| 3648439 | Szczepanski | 4159945 | Savage |

Mason et al (U.S. Pat. No. 3,966,608) discloses a liquid treatment apparatus that has what appears to be an aeration area around impeller 40. Sludge then proceeds through filter media 30 in a recirculating manner. The principal interest revolves around the use of a plastic material for the filter media, using, for example, 3.5 inch Flexirings, having large surface contact area (see col. 2, lines 65 et seq.).

Kielback (U.S. Pat. No. 3,122,594) discloses a contact tower having a bed 25 comprised of spheres or balls 27 (e.g. table tennis balls) contained in the chamber 12 by grids 14 and 16.

Szczepanski (U.S. Pat. No. 3,648,439) discloses a buoyant filter mass having an enclosed area made of parallel rods 33, with the buoyant balls 32 located therein. The other noted references are of general background interest.

SUMMARY OF THE INVENTION

According to the invention a central aeration chamber is provided at each side with biological filters positioned that aerated sludge is circulated up from the central aeration chamber and into the biological filters. A crossover pipe connects the biological filters and is positioned below the top level of the sludge in the aeration chamber. An exit pipe and an anti-syphon vent piper are connected to the crossover pipe. The exit pipe communicates with the chlorine tank through a flexible hose. The chlorine tank is a two-section apparatus, the sections being separated by a baffle. The filter medium in the biological filters are a plurality of hollow plastic balls that float on the aerated sludge which provides a contact area for aerobic treatment of the sludge. The buoyant balls are contained by an upper and lower fiberglas grating. The biological filter permits of both physical and biological filtering.

The use of hollow plastic spheres for liquid clarification by the combined effects of biological filtration (surface absorption) and physical filtration (solid entrapment) in the intersticial voids between the spheres. The floating sphere arrangement provides sinuous upward flow passages for the liquid that are large enough to prevent rapid clogging, and also are movable so that the filter can be cleaned easier and more effectively than a fixed media filter system. The elevation of the crossover pipe discharge is above the top of the filter tanks so that the filter tanks are completely full of water eliminating any air space in the clear water zone above the biological filter chamber, so that wave action will not stir up settled sludge and mix it in with the water being discharged. This would cause the effluent from the treatment unit to exceed allowable limits.

The biological filter internal discharge piping arrangement maintains the liquid discharge level in equilibrium with the axis of rotation eliminate flow surges through the system resulting from vessel rolling and pitching.

BRIEF DESCRIPTION OF DRAWINGS

For a detailed description of a preferred embodiment of the invention, reference will now be made to the accompanying drawings wherein:

FIG. 1 is a front perspective view of the primary treatment tank and the chlorine contact tank together with their connections.

FIG. 2 is a vertical sectional view taken on the lines 2—2 in FIG. 3 through the primary treatment tank.

FIG. 3 is a horizontal sectional view taken on the lines 3—3 in FIG. 2.

DESCRIPTION OF PREFERRED EMBODIMENT

Referring to FIGS. 1 through 4, the sewage treatment unit consists of two interconnected metal tanks 10, 11 completely enclosed to prevent liquid from flowing out of the tanks due to rolling and pitching action of a vessel at sea. The two tanks are the primary treatment tank 10 and the chlorine contact tank 11.

The sewage to be treated flows into the aeration chamber 12. Incoming sewage causes the gravity displacement of an equal volume of liquid into the two biological filter chambers 13, 14, into the chlorine contact tank 11, and from the chlorine contact tank to overboard. The filter discharges into the separate chlorine contact tank through a hose 15.

The tops of the biological filter chambers 13, 14 are below the normal working level of the liquid in aeration chamber 12. This arrangement eliminates air pockets at the top of the biological filter chambers, and as a result there is no free surface for waves to develop and cause sloshing of the liquid. Sloshing of the liquid would stir up sludge, and prevent the sludge from remaining settled on and in the spherical filter elements 17.

The discharge from each of the two biological filter chambers 13, 14 is through an internal common interconnected pipe 18. At the mid-point of pipe 18, a vertical riser and discharge line 19 defining therewith an inverted T-shaped crossover to carry the displaced liquid from each of the biological filter chambers into hose 15. The liquid then flows into chlorine contact tank 11.

The elevation of discharge line 19 determines the working level of the liquid 20 in the aeration chamber 12. The position of the vertical riser into discharge line 19 is located at the axis of rotation for the plane of liquid in the aeration chamber. The location and elevation of the vertical riser prevent surging of the liquid and sludge through the system as a result of vessel rolling and/or pitching.

The sewage treatment unit utilizes an aerobic biological process to remove the biodegradeable waste material from the sewage. The bacteria naturally contained in the incoming sewage grow and multiply in the aeration tank liquid using the waste material in the sewage as their food supply. A biological sludge or floc is produced that continuously reacts with the sewage waste that has entered the aeration tank.

To keep the biological treatment process aerobic, a continuous supply of dissolved oxygen must be maintained in the liquid flowing through the sewage treatment unit. The dissolved oxygen supplied is obtained primarily from air which is discharged from stainless steel nonclog air diffusers 21 installed near the bottom of the aeration tank. The air flow from the diffusers up through the liquid in the aeration tank causes turbulence and circulation of the liquid. This effect results in complete mixing of the unprocessed waste with the active biological floc in the liquid. This action will advance and increase the frequency of contact of waste with the floc in the aeration tank, and ensure effective and rapid waste removal. In addition, the turbulence in the aeration tank will prevent sludge and waste solids from building up on the bottom of the aeration tank.

The air from the aeration tank diffusers is discharged to atmosphere by means of an atmospheric vent line 22 connected to the tank.

As sewage flows into the aeration chamber, biological sludge and with some partially treated sewage is displaced up into the bottom, inlet section of the biological filter chamber. As the liquid flows up into the bottom layer of spherical filter elements 17, some of the sludge and entrapped sewage waste solids will separate from the liquid by gravity settling. The inlet zones 23 of the biological filter chambers have sloped sides to direct the settled solids back toward the diffusers 21. The vertical cross sectional areas of the biological filter inlet zone is designed to be large enough so that the upward velocity of the liquid is minimized. This hydraulic design arrangement allows more time for solid separation by settling in zone 23.

The liquid flowing up from the bottom of the filtr tank will pass over the surface of several layers of plastic spheres 17. The plastic spheres are about 1¾ inches in diameter and are hollow. The spheres will float, but are kept below the surface of the liquid by fiberglas grating 24 that functions as a retention screen for the spheres. A second fiberglas retention grating 5 is installed below the layers of spheres 17 to keep the spheres from being washed out when the filter is being cleaned.

Bacteria grow on the surface of the spheres and produce a sticky layer of biological slime that traps suspended and dissolved waste material in the liquid flowing up and around the surface of the spheres. In addition to this biological filtration effect, solids are also trapped in the spaces between the spheres. The combined effects of biological and physical filtration provide the required clarification of the water.

The use of several layers of spheres 17 results in a relatively large surface area needed for effective biological filtration, the absorption of waste material onto the biological slime surface and the packing arrangement of the spheres causes a sinuous flow pattern that will increase retention time and the probability of waste removal.

Other biological waste water treatment systems using fixed media for biological filtration use a media that has a honeycomb configuration. The honeycomb fixed media consists of relatively large vertical flow channels that induce a sinuous flow pattern. However, the flow channels are separated and have a relatively large cross sectional flow area for each channel since the liquid is aerated and the air must rise up through the channels with the liquid. Only liquid flows through the arrangement using plastic spheres, the relatively small flow passages around the spheres provides a restriction that will physically trap solids. This physical filtration effect will not occur in systems using the honeycomb fixed media biological filtration systems.

Filtration systems using a granular type media such as sand or gravel are primarily physical filtration systems. The plastic spheres are not intended to provide the same degree of physical filtration possible with granular type filters because the filter would clog up very rapidly.

Another significant feature of the floating plastic sphere arrangement, is that it will permit more effective cleaning than a system using the fixed media arrangement. After the biological filter tank has been drained, the fiberglas retention grating on the top of the filter can be removed. The plastic spheres 17 can then be stirred around with a wooden stick and rinsed off with a water hose. If necessary, some of the spheres can be removed to provide easier access to rinse off the spheres in the bottom. Since the spheres are not fixed media, they can be moved around easily for more effective cleaning.

The biological waste removal reaction in the biological filter is also aerobic. The aeration rate of the liquid in the aeration tank is designed to be high enough so that the level of dissolved oxygen in the liquid flowing from the aeration tank into the biological filter tank will contain enough residual dissolved oxygen to keep the process aerobic.

Air supply for the sewage treatment unit is obtained from a positive displacement blower 26. The vessels air supply can be used for standby service air instead of the blower. The air flow to the aeration tank diffusers 21 are controlled by valve 27.

The clear liquid discharge from the biological filter accumulates on top of the filter and is eventually displaced into pipe 18. The accumulation of the clarified liquid on top of the filter provides additional retention time for solids settling in the event solids should carry over from the filter. In addition, the clarified liquid provides a residual clear water volume that will be displaced before liquid flowing up through the filter is discharged.

The vertical riser into discharge line 19 has a short nipple installed in the top of the line which functions as an antisyphon vent 28. The antisyphon vent 28 prevents continuous discharge of liquid into the chlorine contact chamber 30 has valve 39 to isolate the chlorine contact chamber 11 through hose 15 after sewage has stopped flowing into the aeration chamber.

Brackets are installed around the perimeter of the fiberglas retention grating to prevent liquid from short circuiting the filter element and flowing up between the tank wall and spheres.

The clear liquid displaced from the top of the biological filters into hose 15 will flow down into the chlorine contact chamber 11. A chlorine disinfectant chemical (such as ordinary laundry bleach) is injected into the chlorine contact tank at 29. The liquid discharge from hose 15 mixes with the chlorine disinfection chemical (ordinary laundry bleach) in the bottom part of the chlorine contact chamber. The chlorine contact chamber volume is designed to provide adequate retention time for disinfection prior to discharge through the discharge connection 30.

The chlorinated liquid must flow under and up through baffle 31 before entering the inlet to discharge 30. This arrangement will promote mixing of the liquid for disinfection.

The treated liquid can also be pumped overboard. Discharge pumping arrangement not shown.

The liquid chlorine disinfectant chemical is stored in a separated plastic chemical tank 32, and injected by gravity flow into the chlorine contact chamber at a connection through plastic tubing 33. The chlorine chemical flow control is by means of a PVC needle valve 34. A chemical injection pump can be used instead of the gravity injection arrangement shown.

Access hatches 35 on top of the biological filters can be removed for flushing the filter with a water hose from the top.

The aeration tank 10 has an access hatch 36 and drain valves 37 as does the chlorine chamber 11, at 38 respectively. The discharge from the chlorine contact chamber 30 has valve 39 to isolate the chlorine contact chamber while draining other tanks.

Each biological filter chamber has a vent valve 40 to vent air from the chamber when filling the unit during start-up operation.

The vent and intake connections can be positioned on any side to accommodate installation requirements for specific vessels.

What I claim is:

1. A marine sewage disposal system for use on board a vessel comprising:
   (a) a central aeration chamber having air diffusers supplied with air from a blower and being positioned to supply air from the bottom of said chamber upwardly toward the top, said chamber adapted to receive sludge to a top level therein;
   (b) a pair of biological filters, one positioned to each side of said aeration chamber and contiguous therewith, to receive aerated sludge therefrom, said biological filters having a plurality of buoyant plastic hollow spheres retained in filter tiers on foraminous grating so that as the liquid flows up through the spherical filter tiers some of the sludge and entrapped sewage waste solids will separate from the liquid by gravity settling and dissolved oxygen is supplied to bacteria on said biological filters by liquid convection and oxygen diffusion,
   (c) a crossover pipe connecting said filters and being positioned below the top level of sludge in said aeration chamber; and
   (d) a chlorine contact tank connected to receive clarified liquid from said crossover pipe by a flexible exit pipe to transfer clarified liquid from the biological filters to the chlorine tank for treatment with chlorine from a source of chlorine, prior to discharge.

2. A sewage disposal system as claimed in claim 1 wherein said chlorine contact tank has a chamber volume to provide retention time for disinfection prior to discharge so that chlorine can be injected into the liquid and said chlorinated liquid is compelled to flow under and up through a baffle before discharging the liquid overboard.

3. A sewage disposal system as claimed in claim 2 wherein said crossover pipe communicates with a vertical riser which has a short nipple in the top of the crossover line which functions as an anti-syphon vent which prevents continuous discharge of liquid into the chlorine contact chamber through said flexible exit pipe after sewage has stopped flowing into said central aeration chamber, said riser preventing discharge of liquid into the chlorine contact tank as a result of vessel motion.

4. A marine sewage disposal system for use on board a vessel comprising:
   (a) a central aeration chamber having air diffusers supplied with air from a blower and being positioned to supply air from the bottom of said chamber upwardly toward the top, said chamber adapted to receive sludge to a top level therein,
   (b) a pair of biological filters, one positioned to each side of said aeration chamber and contiguous therewith, the bottom of said aeration chamber communicating with the bottom of each of said biological filters to supply aerated sludge to said biological filters, each of said biological filters having a plurality of buoyant plastic hollow spheres retained in filter tiers on foraminous grating so that as the liquid flows up through the spherical filter tiers some of the sludge and entrapped sewage waste solids will separate from the liquid by gravity settling and dissolved oxygen is supplied to bacteria on said biological filters by liquid convection and oxygen diffusion,
   (c) an inverted T-shaped crossover pipe connecting said filters with the horizontal portion of the T-shaped crossover which lies below the top level of sludge in said aeration chamber and the upper end of the vertical leg of the T-shape is above the level of sludge in said aeration chamber, and
   (d) a chlorine contact tank connected to receive clarified liquid from the upper end of said inverted T-shaped crossover pipe by a flexible exit pipe to transfer clarified liquid from said biological filters to the chlorine tank for treatment with chlorine from a source of chlorine, prior to discharge.

5. A marine sewage disposal system for use on board a vessel as claimed in claim 4 wherein said chlorine contact tank comprises a tank separated by a baffle to promote mixing of the liquid for disinfection.

* * * * *